May 20, 1958 J. BAXTER, JR., ET AL 2,835,144
VARIABLE SPEED POWER TRANSMISSION FOR PAPER MACHINERY
Filed Sept. 17, 1956 3 Sheets-Sheet 1

INVENTOR.
JOSEPH BAXTER, JR
STEPHEN A. STAEGE
BY
ATTORNEYS

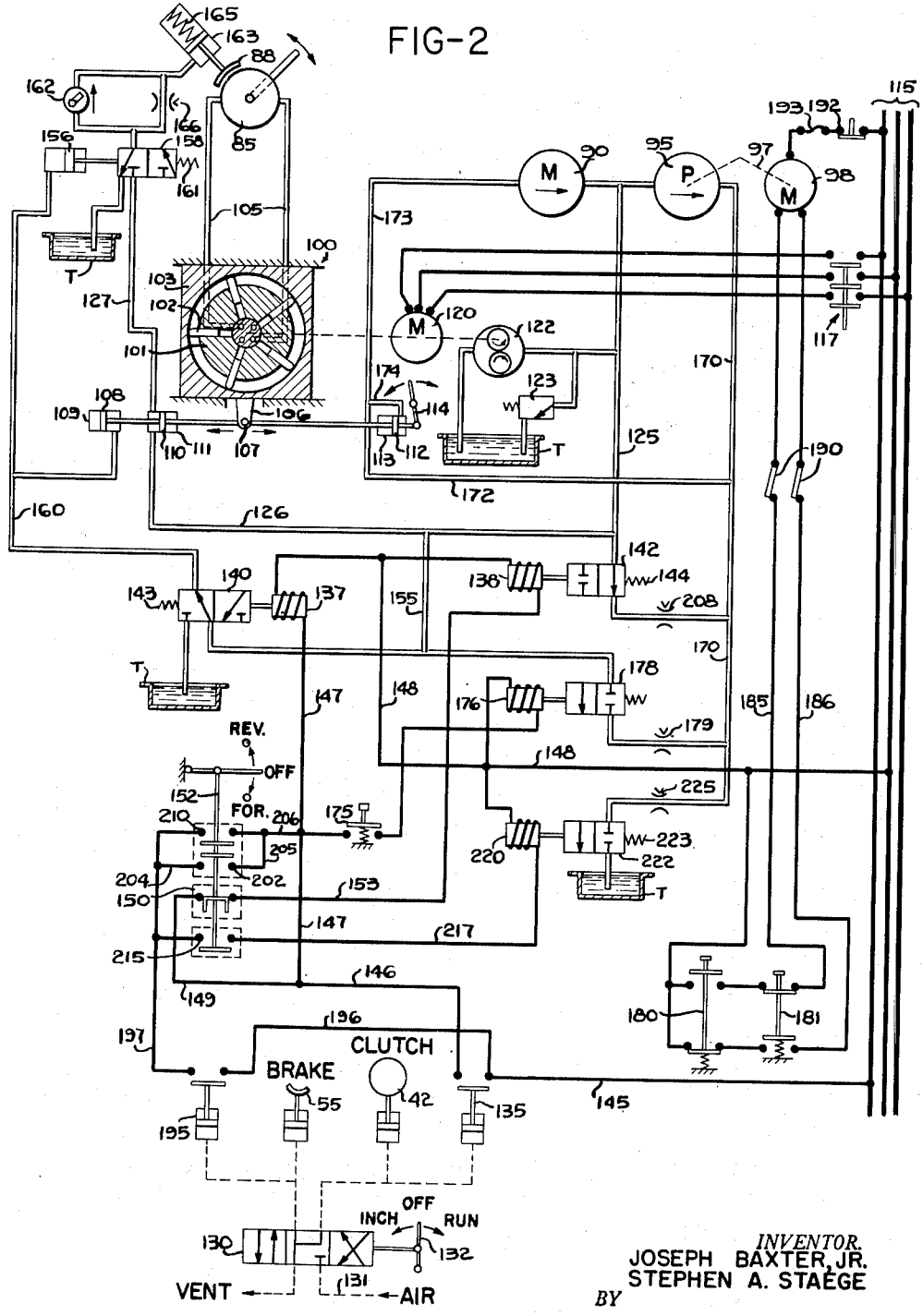

May 20, 1958     J. BAXTER, JR., ET AL     2,835,144
VARIABLE SPEED POWER TRANSMISSION FOR PAPER MACHINERY
Filed Sept. 17, 1956     3 Sheets-Sheet 3
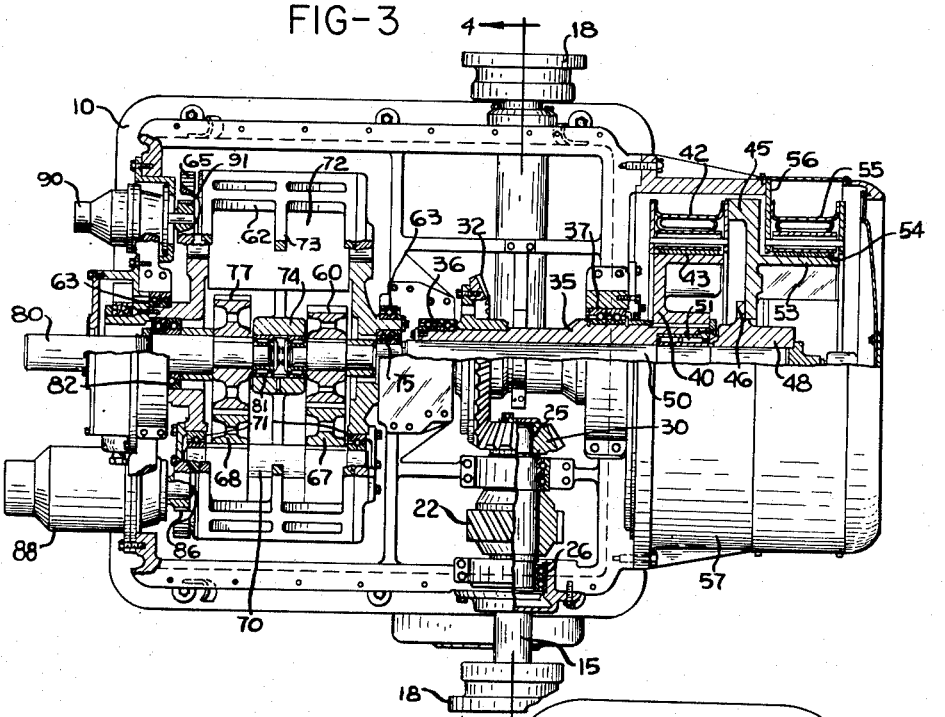
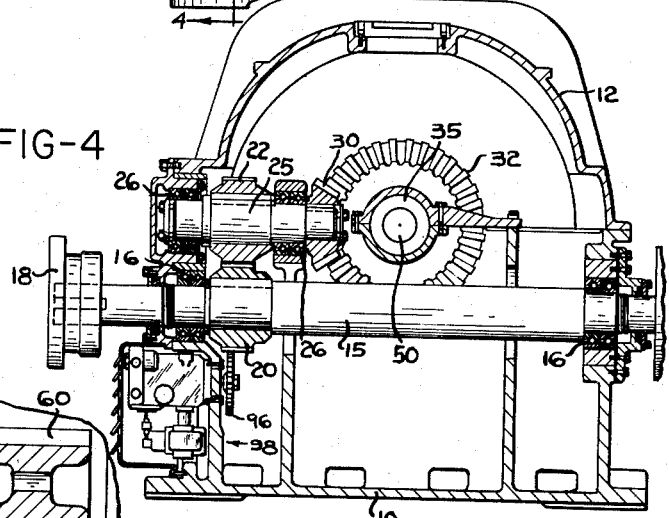
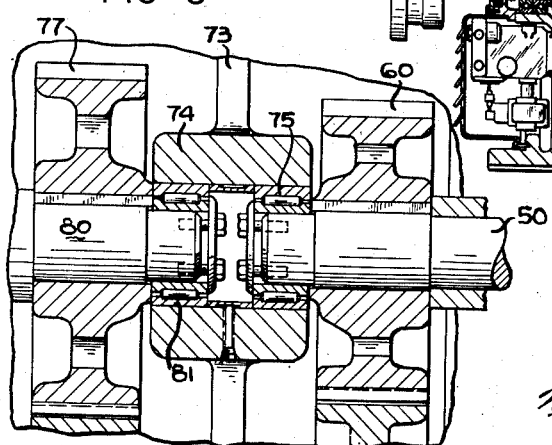
INVENTOR.
JOSEPH BAXTER, JR.
BY STEPHEN A. STAEGE
ATTORNEYS United States Patent Office 2,835,144
Patented May 20, 1958

2,835,144

VARIABLE SPEED POWER TRANSMISSION FOR PAPER MACHINERY

Joseph Baxter, Jr., Franklin, and Stephen A. Staege, Hamilton, Ohio, assignors to The Black-Clawson Company, Hamilton, Ohio, a corporation of Ohio Application September 17, 1956, Serial No. 610,070

15 Claims. (Cl. 74—675)

This application relates to paper machinery, and particularly to a differential drive for use in regulating the speeds of the various sections of a paper machine.

The primary object of this invention is to provide an improved infinitely variable differential drive and control therefor which will afford a positive closely controlled speed differential between various sections of a paper machine.

Another object of this invention is to provide such an improved differential drive having adjustable synchronous speed characteristics which enable the drive to maintain a selected output speed regardless of changes in the load on the drive output.

A further object is to provide such a drive which, due to its synchronous speed characteristics, maintains a desired speed differential between sections of a paper machine regardless of changes in load on the section operated by the drive and regardless of slight changes in line shaft speeds.

An additional object is to provide an improved differential drive and control for a paper machine which incorporates manually actuated devices for changing the draw on the web at the section coupled to the drive, and for taking up slack in the web between such section and the adjacent section of the machine.

A further object of this invention is to provide a differential drive which may be used to inch a section of a paper machine in either forward or reverse direction regardless of whether the machine line shaft is rotating.

Other objects and advantages of the invention will be apparent from the following description, the accompanying drawings and the appended claims.

In the drawings—

Fig. 2 is a schematic diagram of the control system for the differential drive unit in Fig. 1;

Fig. 3 is a view partly in section and partly in elevation looking upon the drive unit of Fig. 1 from above;

Fig. 4 is a sectional view taken on line 4—4 in Fig. 3; and

Fig. 5 is a detail view, partly in section, of the shaft ends and bearings mounted within the rotating cage of the drive unit as shown in Fig. 3.

Figure 1:
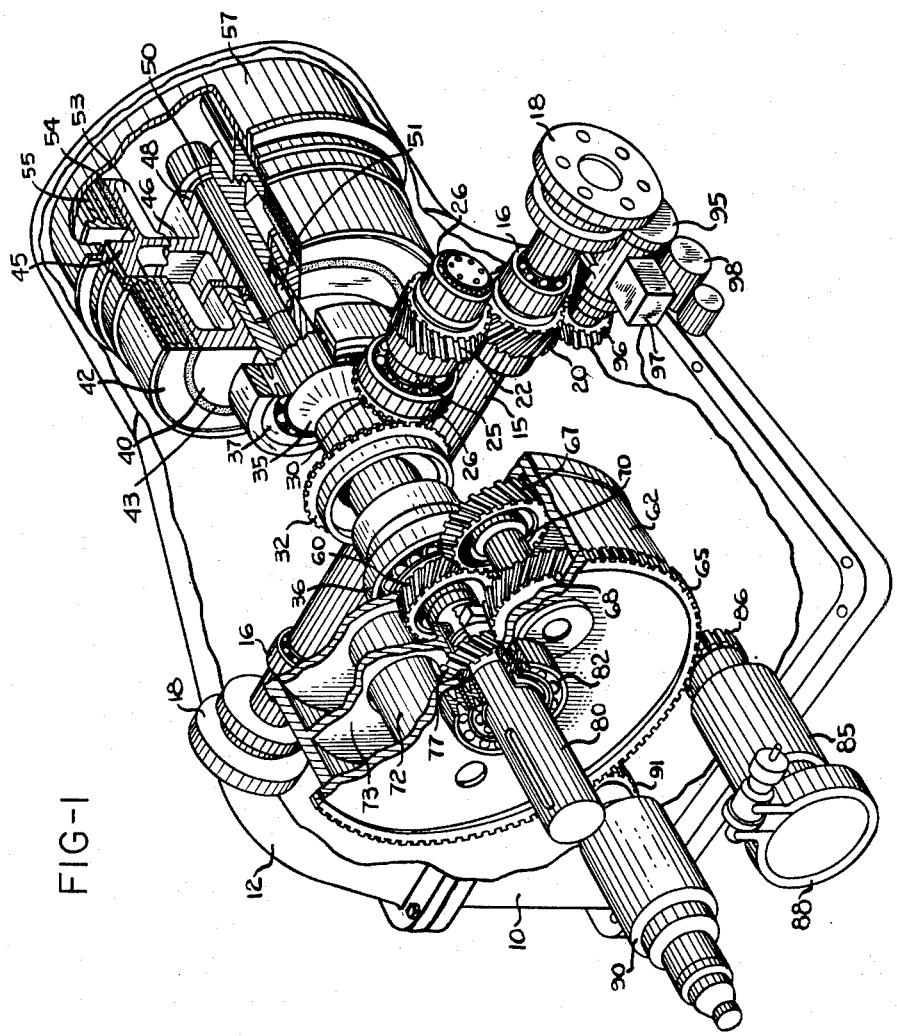
Fig. 1 is a perspective view, partly in section and partly in elevation, of a differential drive in accordance with the invention.

Referring to the drawings, which illustrate a preferred embodiment of the invention, the drive unit is housed within a casing including a base 10 and a removable cover 12, and a line shaft section 15 extends transversely through base 10 and is journaled therein by suitable bearings 16. This line shaft section includes flexible couplings 18 at its opposite ends providing for coupling the section into the line shaft of the paper machine. A drive gear 20 is fixed to shaft 15 and meshes with a gear 22 fixed to an input shaft 25 which is journaled in bearings 26 carried within base 10. A bevel drive pinion 30 is mounted on the inner end of shaft 25, and meshes with a bevel gear 32 fixed to a hollow quill 35 to provide a right angle drive between the line shaft and a section of a paper machine.

The quill 35 is journaled within fore and aft roller bearings 36 and 37, respectively, and at its aft end the quill is secured to the rotating inner member 40 of a pneumatic clutch having an outer pneumatically operated shoe 42 adapted for frictional engagement with inner member 40 through suitable friction material 43. The clutch shoe 42 is fixed to a rotatable drive member 45 which is in turn carried in fixed relation on the annular web portion 46 of a hollow drive member 48 fastened to the aft end of an inner or transmission shaft 50 which extends through quill 35, being journaled therein by suitable roller bearings 51.

The drive member 45 also includes a rearwardly extending cylindrical drum portion 53 surrounded by frictional material 54 through which the fixed shoe 55 of a pneumatic brake is adapted to engage the drive member 45 to hold it stationary with respect to the main housing, shoe 55 being secured by a suitable bracket 56 to a cover 57 which is secured to the end of the main housing in any suitable manner and serves to house the brake and clutch. At its forward end, shaft 50 carries a helical spur gear 60 which constitutes the input of an epicyclic gear train including a cage 62 rotatably mounted in bearings 63 and provided with an annular or ring gear 65. The cage carries a pair of helical spur gears 67 and 68 fixed to a counter shaft 70 mounted in cage 62 on bearings 71 in spaced relation to the axis of rotation of gear 60 so that shaft 70 may be rotated about such axis. A counterweight 72 is carried at the opposite side of cage 62 to balance the cage. The cage includes a central web 73 having a cylindrical bearing carrier 74 at its center housing a roller bearing 75 which supports the end of shaft 50. An output gear 77 meshes with gear 68 and is fixed to output shaft 80 having its inner end supported in a bearing 81 within carrier 74 and extending outwardly through a bearing 82 mounted in base 10. Shaft 80 is adapted for connection to a section of a paper machine, such for example as a calender or dryer section, generally through gear reductions (not shown).

A reversible hydraulic motor 85 drives a spur pinion 86 in mesh with cage ring gear 65, and a normally disengaged hydraulically actuated brake 88 is provided on motor 85 for holding the motor shaft stationary, and thereby holding cage 62 stationary if such action is necessary under emergency conditions to prevent runaway of the section driven from the unit. A hydraulic feedback tachometer motor 90 of fixed displacement is adapted to rotate in unison with ring gear 65 through a gear 91 in mesh therewith, and thus the revolutions of tachometer motor 90 will be in direct proportion to the rotation of cage 62. Also, a variable displacement hydralic tachometer pump 95 is adapted to be driven from line shaft section 15 by a gear 96 in mesh with drive gear 20, and the output of tachometer pump 95 may be varied by a suitable control 97 operated by a reversible electric control motor indicated generally at 98.

The drive unit thus is capable of driving directly from line shaft section 15 to output shaft 80 with the pneumatic clutch engaged and the pneumatic brake released, and if the cage remains stationary, rotation of the output shaft will be in direct proportion to line shaft speed, as determined by the various gear ratios in the drive. In an actual unit this reduction may be, for example, from 1000 R. P. M. line shaft speed to about 347 R. P. M. at output shaft 80. When brake 88 is released and cage motor 85 is driven in either a forward or reverse direction, the differential action of the epicyclic gear train will be such that the output shaft will rotate faster or slower than the line shaft, as determined by the rate of rotation and direction of rotation of the cage, which in turn determines the compound movements of the epicyclic gear train. A suitable control is obtained through use of a cage motor capable of varying the output R. P. M. through a range of ±5%, although greater ranges can be obtained if desired.

It is also possible to disengage the drive unit from the line shaft by disengaging the pneumatic clutch. With the clutch disengaged, the pneumatic brake may then be applied to hold the input gear 60 of the epicyclic transmission stationary, and by driving cage 62 in a forward or reverse direction with motor 85, it is possible to "inch" output shaft 80 in either a forward or reverse direction, regardless of whether or not the line shaft is rotated. With a cage motor of ±5% control capabilities, the inching speeds will be up to about 5% of maximum running speed in both forward and reverse directions.

Motor 85 is driven by a variable positive displacement pump which is reversible in displacement, and which is indicated generally at 100, for example of the type having a rotor 101 with a plurality of pistons 102 movable in cylinders extending radially of the rotor. The stroke of the pistons is regulated by varying the centering of a surrounding slipper ring 103 with respect to the center of rotation of the rotor, and thus pump 100 may be regulated to pump pressure fluid in varying amounts through either of the hydraulic lines 105 providing a closed circuit between it and motor 85, or the pump may be moved to a central neutral position. The control for the pump is illustrated schematically in Fig. 2 as including a yoke 106 extending from slipper ring 103 and connected by a rod 107 with a piston 108 in a hydraulic cylinder 109. The piston 108 is responsive to pressure thereon to shift the pump 100 to its neutral or "no discharge" position. The rod 107 is also connected with additional control pistons 110 and 112 in cylinders 111 and 113, respectively. A manual control for pump 100 may also be provided as shown at 114. It is to be understood that the drawing of these cylinders, pistons, and controls is only schematic, since they are well known, per se, and the areas and strokes of the pistons may be chosen from commercially obtainable items.

Fig. 2 illustrates the control system in a neutral or non-running position. Electrical power from a suitable 3-line source 115 is supplied through a controller 117 to the drive motor 120 for pump 100, and this drive motor also powers a gear pump 122 supplying hydraulic fluid at a constant pressure, as regulated by relief valve 123, to a pressure line 125 which supplies tachometer pump 95 and into which the tachometer motor 90 exhausts. Pressure line 125 is connected through line 126 to the constant pressure piston 110 of pump 100, and through cylinder 111 to line 127. It is also possible to drive pumps 100 and 122 from the line shaft of the machine if desired, so long as the speed range of the line shaft is not too great.

The differential drive unit has two separate primary functions, namely (1) to provide a positive closely controlled speed differential between various sections of a paper machine, and (2) to inch the machine sections independently of the main drive through the line shaft of the machine. In connection with the driving function, the control provides for three secondary functions when driving, namely to regulate the rotational speed of the particular section of the machine being driven so as to maintain the proper relative speeds, to take up slack in the web, and to increase or decrease the draw on the web. In connection with the second or inching function, the control provides for inching in either a forward or reverse direction.

The main control is provided by a three-way manually operated pneumatic valve 130 through which a supply of compressed air from a suitable source 131 may be connected to the pneumatic clutch or the pneumatic brake in the drive unit. Movement of the manual control lever 132 by the operator will set the drive unit for either of the two primary functions, namely to drive or to inch.

*Drive—Regulate*

One of the principal functions of the drive unit is to regulate and maintain a constant desired relative speed between adjacent sections of the paper machine by, for example, increasing the rotational speed of the machine section driven by the differential drive unit over the rotational speed of a preceding section of the machine. This difference in rotational speeds of these two sections is relatively small, and if the draw is to be properly maintained the differential in speed must be accurately maintained even under varying load conditions.

To set the unit for its normal driving and regulating function, the operator moves valve 130 to the "run" position wherein air under pressure is supplied to the pneumatic clutch 40—42 to engage the clutch and thereby to provide for driving of the input gear 60 of the epicyclic transmission at a fixed rate in proportion to line shaft speed. At the same time, the pneumatic brake 53—55 is vented to atmosphere and released. Supply of air pressure to the clutch also causes closing of an air pressure operated electrical switch 135 and provides for energizing of solenoids 137 and 138 which control two-way hydraulic valves 140 and 142, with the solenoids acting against springs 143 and 144 which normally urge valves 140 and 142 into the positions illustrated. The energizing circuit for solenoid 137 runs through power line 145 to switch 135, thence to line 146, line 147, and to another wire of the three-line supply 115 through the line 148. The circuit for solenoid 138 is through switch 135, line 146, line 149 through the normally closed contacts 150 of a three-position multiple contact electrical switch indicated generally at 152, and from contacts 150 through line 153 to solenoid 138 and to line 148.

Pressure from gear pump 122 and hydraulic line 125 is supplied in the "off" position of valve 130 (but with motor 120 running) through a branch line 155, and through two-way valve 140, to cylinder 109 and also to the control cylinder and piston 156 of a two-way hydraulic valve 158 through line 160. The valve 158 is thus normally held against the bias of spring 161, and pressure from line 127 is cut off at valve 158. However, when solenoid 137 is energized, valve 140 moves to the connect line 160 to the tank T, and this results in venting of cylinder 109 and 156 to tank or low pressure. Valve 158 is shifted by spring 161 to admit pressure through a check valve 162 into the control cylinder 163 of hydraulic brake 88, which is normally engaged to hold the shaft of motor 85 stationary by a spring 165. Pressure from line 125 then releases brake 88 and permits the hydraulic motor 85 to be driven by pump 100 in direct relation to its output and sense of output, i. e., motor 85 will be driven in either a forward or reverse direction and at variable speeds in each direction in proportion to the variations in displacement of pump 100 on either side of its neutral position. A needle valve 166 is provided in parallel with check valve 162 to meter flow out of cylinder 163 and control the rate at which brake 88 may be applied.

The tachometer pump 95 receives hydraulic fluid at a constant pressure from gear pump 122 and line 125, and it discharges fluid into a tachometer circuit including lines 170, 172 and 173 which conveys fluid at a higher pressure from tachometer pump 95 to tachometer feedback motor 90 and back to line 125. Thus for any given setting of pump 95, there is a reference pressure at the output of that pump corresponding to the desired speed differential in the drive unit. So long as the desired speed differential is maintained, pump 95 and motor 90 remain in phase, but should the differential vary from that desired, as for example by an increase in load on the output shaft of the drive unit, then the cage 62 will react accordingly and motor 90 will follow, becoming angularly out line shaft by releasing the pneumatic clutch and hydraulic brake 88 is also released, in the same manner as previously described. Switch 152 is then moved to the "reverse" position, up in Fig. 2, and contacts 210 are closed to enerize solenoid 137 by connecting line 197 with line 147 through the switch and line 206. Contacts 150 are normally closed in the "off" position of the switch, and are closed also in the "reverse" position, these contacts being open only when switch 152 is moved to the "forward" position. Also, normally open contacts 215 are closed in the reverse position to connect line 217 with line 197. Thus solenoids 137, 138 and a third control solenoid 220 are all energized when switch 152 is in the "reverse" position.

Solenoid 220 controls a normally closed two-way hydraulic valve 222 operating against the bias of spring 223, and this valve is arranged to connect the tachometer control pressure conduit 170 to tank T through an adjustable metering or needle valve 225. The hydraulic brake 88 is therefore released, valve 142 is closed to block flow between conduits 125 and 170, but the tachometer circuit is drained to tank through valve 225 and valve 222, allowing the pressure on piston 112 to drop and causing pump 100 to move through its neutral position to a position where its output is reversed, the rate and magnitude of such shifting being determined by the rate of flow through valve 225. Cage motor 85 is accordingly driven in reverse and output shaft 80 is inched in reverse.

The present invention thus provides an infinitely variable differential drive unit which is capable of maintaining within close tolerances a desired controlled speed differential, and which affords a positive drive between a line shaft and a driven section of a paper machine or the like. The unit will maintain a selected speed differential regardless of load changes on the section being driven, and regardless of slight changes in line shaft speed. Furthermore, the present invention provides a control for taking up slack on the web passing to the section driven by the unit, and also provides a control for varying the draw on the web as desired. The present drive unit is also capable of inching the section being driven in either forward or reverse directions regardless of whether or not the machine line shaft is rotating. The drive unit is compact and utilizes helical spur gears throughout, with the exception of the right angle drive and the ring gear on the cage. This provides a highly efficient drive unit capable of continuously transmitting any desired horsepower within the capacity of the drive.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A differential drive unit and speed regulating device for a paper machine or the like having a line shaft and a driven shaft, comprising an input shaft, means for coupling said input shaft to the line shaft for driving said input shaft at a speed proportional to line shaft speed, an output shaft adapted for connection with the driven shaft, a transmission shaft having a driving connection with said input shaft, an epicyclic gear train including first, second, and third elements each mounted for rotational movement with respect to the others, means connecting said transmission shaft to one element of said train, means connecting a second element of said train to said output shaft, a reversible variable speed driving means connected to drive a third element of said train to control the relative speed of said second element with respect to said input shaft, and means for regulating the speed of said driving means in accordance with the phase displacement between said input shaft and said third element to provide synchronous speed characteristics for said second element.

2. A differential drive unit and speed regulating device for a paper machine or the like having a line shaft and a driven shaft, comprising an input shaft, means for coupling said input shaft to the line shaft for driving said input shaft at a speed proportional to line shaft speed, an output shaft adapted for connection with the driven shaft, a transmission shaft having a driving connection with said input shaft, an epicyclic gear train including first, second, and third elements each mounted for rotational movement with respect to the others, means connecting said transmission shaft to one element of said train, means connecting a second element of said train to said output shaft, a variable speed hydraulic motor connected to drive a third element of said train to control the relative speed of said second element with respect to said transmission shaft, and means for regulating the speed of said motor in accordance with the phase displacement between said transmission shaft and said third element to provide synchronous speed characteristics for said second element.

3. A differential drive unit and speed regulating device for a paper machine or the like having a line shaft and a driven shaft, comprising an input shaft, means for coupling said input shaft to a line shaft for driving said input shaft at a speed proportional to line shaft speed, a transmission shaft having a driving connection with said input shaft, an epicyclic gear train including first, second, and third elements each mounted for rotational movement with respect to the others, means connecting said transmission shaft to one element of said train, means for coupling a second element of said train to said driven shaft, a variable speed hydraulic motor connected to drive a third element of said train to control the relative speed of said second element with respect to said transmission shaft, a hydraulic pump connected to said motor to drive said motor at variable speeds in forward and reverse directions, means for controlling the output of said pump to vary the speed of said motor, and means regulating said pump controlling means in accordance with the phase displacement between said transmission shaft and said third element to provide a synchronous speed output at said second element.

4. A differential drive unit and speed regulating device of the character described comprising an input shaft, means for coupling said input shaft to a line shaft for driving said input shaft at a speed proportional to line shaft speed, a transmission shaft having a driving connection with said input shaft, an epicyclic gear train including first, second, and third elements each mounted for rotational movement with respect to the others, means connecting said transmission shaft to one element of said train, means for coupling a second element of said train to the apparatus to be driven, a variable speed hydraulic motor connected to drive a third element of said gear train to control the relative speed of said second element with respect to said transmission shaft, a variable displacement hydraulic pump connected to deliver hydraulic fluid under pressure to said motor, means for controlling the displacement of said pump to vary the speed of said motor, and means regulating said pump controlling means in accordance with the phase displacement between said transmission shaft and said third element of said gear train to provide a synchronous speed output at said second element.

5. A differential drive unit and speed regulating device of the character described comprising an input shaft, means for coupling said input shaft to a line shaft for driving said input shaft at a speed proportional to line shaft speed, a transmission shaft having a driving connection with said input shaft, an epicyclic gear train including first, second, and third elements each mounted for rotational movement with respect to the others, means connecting said transmission shaft to one element of said gear train, means for coupling a second element of said gear train to the apparatus to be driven, a hyof phase, either advancing with respect to pump 95 or lagging behind it.

Such angular phase displacement will cause the pressure in the circuit between pump 95 and motor 90 to vary, increasing when the tachometer motor lags, and this increase in pressure is communicated through a branch line 174 to the tachometer control piston 112 so as to reset pump 100 for a greater output, thereby supplying a greater quantity of hydraulic fluid to cage drive motor 85 and speeding up the cage to bring the tachometer pump and the tachometer motor back into phase. Conversely, should the load on the drive unit output shaft 80 decrease, with consequent overspeeding of the unit, then the tachometer motor 90 will overspeed or advance out of phase with respect to tachometer pump 95. The pressure at the tachometer circuit will then drop and the constant pressure exerted at piston 110 will overcome the lower pressure at piston 112 to decrease the output of pump 100.

This arrangement provides for accurate control over the output shaft speed of the differential drive unit, and adjusts the displacement of the pump so as to maintain the speed of output shaft 80 in fixed predetermined relation to line shaft speed. Tachometer pump 95 is driven in direct proportion to line shaft speed and is preset for a desired output with respect to line shaft speed. In other words, any slight variation in line shaft speed will result in a corresponding variation in the output of tachometer 95, but at the same time the desired preset relation between the output of this tachometer and the rotational speed of the line shaft is maintained.

The pump 100 must at all times have the same displacement as the motor plus whatever leakage there may be past the pistons of the pump and motor. However, any slowing down of motor 85 will instantly build up enough additional pressure to resist the increased torque, even though the displacement of pump 100 might remain constant. The increased leakage due to higher pressure might cause a slight lagging of motor 85, but feedback tachometer 90, slowing with motor 85, will automatically maintain the desired speed setting. The drive unit is thereby made synchronous, although adjustable. Any factors which might normally be expected to result in a small change in speed, such as change in load, change in temperature, compressibility of the fluid, or expansion of pipe lines, are all automatically compensated for by the feedback tachometer so that synchronous speed will be maintained.

With a line shaft speed of about 1000 R. P. M., and with the gearing selected so that output shaft speed is about 347 R. P. M. when cage 62 is stationary, rotation of the cage in the direction of rotation of the output shaft will add about ⅓ R. P. M. to the R. P. M. of the output shaft for each complete revolution of the cage, and conversely, one revolution of the cage in a direction opposite the rotation of shaft 80 will reduce the R. P. M. of that shaft about ⅓ R. P. M. By designing the unit so that normal desired section speeds are approximately equal to the output of the unit with the cage stationary, and since motor 85 can operate on both sides of zero speed of the cage, the horsepower capacity of this motor needs to be only one-half as much as it would be if it only ran in one direction of rotation, and on one side of zero speed of the cage.

Drive—Slack takeup

If the operator finds that it is necessary to take up slack in the web passing to the section of the machine powered by the drive unit (generally in the calender and reel sections following a break in the web and reentry of the web into such section), he may do so by closing the switch 175, thereby energizing solenoid 176 to shift normally closed two-way hydraulic valve 178 to its open position. This causes the tachometer circuit to drop to gear pump pressure (from line 155) and lower the pressure in the cylinder 113 of tachometer control piston 112 at a rate of flow determined by the setting of a needle valve 179 in the line between valve 178 and conduit 170. The areas of pistons 110 and 112 are such that this shifts pump 100 in a direction to increase its output, and accordingly increases the speed of cage drive motor 85 until the slack in the web is taken up. Release and opening of switch 175 will then deenergize solenoid 176 to close valve 178 and the control will regulate, as described above, to maintain the desired draw in the web in accordance with the setting of tachometer pump 95.

Regulate—Draw change

To change the draw on the web, the operator resets tachometer pump 95 for a greater or less output, as the case may be. For this purpose, an increase switch 180 and a decrease switch 181 are connected to energize selectively either the forward or reverse supply lines 185 and 186 to reversible electric control motor 98. Suitable limit switches may be interposed in these lines to control the maximum movement of the control motor in either direction, and such limit switches are indicated generally at 190.

To increase the draw, for example, the operator pushes switch 180 to close its upper contacts, and a circuit is completed through a main motor control switch 192 and fuse 193 to motor 98, and through line 185, the back contacts of switch 181, and switch 180 to line 148. The control motor 98 will thus turn in a forward direction to reset tachometer pump 95 and vary the reference pressure from this pump, providing for an increase of speed in the forward direction of cage drive motor 85. To decrease the draw, the operator moves switch 181 to close its lower contacts, and a circuit is completed through these contacts and the back contacts of switch 180, and through line 186 to control motor 98, causing it to turn in a reverse direction and reset tachometer pump 95 for a decrease in the output of pump 100 and corresponding decrease in speed of cage motor 85.

Inch—Forward

The drive unit may also be used for inching the associated section of the paper machine, whether or not the line shaft is rotated. To inch forward, the operator manually moves pneumatic valve 130 to the "inch" position, toward the left as viewed in Fig. 2. Air under pressure is then applied to the pneumatic brake, retaining transmission shaft 50 and input gear 60 stationary, and venting the pneumatic clutch to atmosphere, thereby disconnecting shaft 50 from line shaft section 15. At the same time, a pneumatically operated electric switch 195 is closed providing for a supply of electrical power from lines 196 and 197 to the three position multiple contact electrical switch 152 which is movable between "forward" and "reverse" positions through an "off" position as indicated on the drawing.

With this switch in the "forward" position, down in Fig. 2, contacts 202 are closed to complete a circuit through lines 197, lines 204, 205 and 206 to line 147, energizing solenoid 137 to vent the neutral control chamber of pump 100 to tank and also to release brake 88, as described in connection with regulating. All other contacts of switch 152 are opened. Line 125, at gear pump pressure, is then connected through valve 142 into line 170, and the pressure differential between these lines is determined by the opening of a control valve 208. This causes pump 100 to shift in a direction to increase its output and the cage motor 85 is driven forward at an inching speed determined by the opening of valve 208.

Inch—Reverse

In some instances it is necessary to reverse the calender sections, as when a plug of wet paper becomes pinched between the rolls so tight that it must be backed out. To inch in reverse the operator places valve 130 in the "brake on" position and air pressure applies brake 55 and closes switch 195. The unit is released from connection with the draulic motor connected to drive a third element of said gear train, a variable displacement hydraulic pump connected through a closed circuit to deliver fluid under pressure to said motor, means for controlling the output of said motor, regulating means for comparing the rotational speeds of said transmission shaft and said third element of said gear train to produce a control output signal variable in accordance with changes in the speed differential between said transmission shaft and said third element, and means for applying said signal to said pump controlling means to vary the displacement of said pump in relation to variations of said signal to synchronize said transmission shaft and said second element.

6. A differential drive for a paper machine or the like having a line shaft and a driven shaft, comprising an input shaft, means for coupling said input shaft to a line shaft for driving said input shaft at a speed proportional to line shaft speed, a transmission shaft having a driving connection with said input shaft, an epicyclic gear train including input and output gear elements, planetary gears providing a driving connection between said input and output gear elements, a cage supporting said planetary gears, means supporting said cage for rotative movement to revolve said planetary gears about said input and output gear elements and vary the overall difference in speed between said input and output gear elements, means coupling said input gear element to said transmission shaft, means for coupling said output gear element to said driven shaft, a hydraulic motor operatively connected to rotate said cage, means sensing the phase differential between said input shaft and said cage for producing an output signal variable in relation to changes in said phase differential, and means for regulating the speed of said motor in accordance with variations in said signal to maintain the rotational speed of said output gear element in predetermined relation to the rotational speed of said input shaft.

7. A power transmitting and speed regulating device of the character described comprising an input shaft, means for coupling said input shaft to a line shaft for driving said input shaft at a speed proportional to line shaft speed, a transmission shaft having a driving connection with said input shaft, an epicyclic gear train including first, second, and third elements each mounted for rotational movement with respect to the others, means connecting said transmission shaft to one element of said train, means for coupling a second element of said train to the apparatus to be driven, a variable speed hydraulic motor connected to drive a third element of said train to control the relative speed of said second element with respect to said transmission shaft, means for regulating the speed of said motor in accordance with the phase displacement between said transmission shaft and said third element, and means for overriding said regulating means to increase and decrease selectively the speed of said motor.

8. In a device of the character described the combination of an input shaft, means for driving said input shaft at a speed directly proportional to the line shaft speed of a paper machine, a transmission shaft having a driving connection with said input shaft, an epicyclic gear train including first, second, and third elements each mounted for rotational movement with respect to the others, means connecting said transmission shaft to one element of said train, an output shaft, means connecting a second element of said train to said output shaft, said train having a third element arranged to vary the effective relative rotation between said one and said second elements, means for driving said third element including a synchronous control for maintaining a selected speed differential between said input and output shafts regardless of the load on said output shaft, and means for simultaneously disconnecting said transmission shaft from said input shaft and holding said one gear element stationary providing for driving said output shaft with said third element driving means.

9. In a device of the character described the combination of an input shaft, means for driving said input shaft at a speed directly proportional to the line shaft speed of a paper machine, a transmission shaft having a driving connection with said input shaft, an epicyclic gear train including first, second, and third elements each mounted for rotational movement with respect to the others, means connecting said transmission shaft to one element of said train, an output shaft, means connecting a second element of said train to said output shaft, said train having a third element arranged to vary the effective relative rotation between said one and said second elements, means for driving said third element in forward and reverse directions relative to said input shaft, a synchronous control means operatively connected to said third element driving means for maintaining a selected speed differential between said input and output shafts regardless of the load on said output shaft, and means for simultaneously disconnecting said transmission shaft from said input shaft and for holding said one gear element stationary providing for inching said output shaft in both forward and reverse directions with said third element driving means.

10. In a device of the character described the combination of an input shaft, means for coupling said input shaft to a line shaft for driving said input shaft at a speed proportional to line shaft speed, a transmission shaft, a clutch selectively connecting said input shaft to said transmission shaft, a brake on said transmission shaft for holding said transmission shaft stationary, an epicyclic gear train including first, second, and third elements each mounted for rotational movement with respect to the others, means connecting said transmission shaft to one element of said train, means for coupling a second element of said train to the apparatus to be driven, a variable speed hydraulic motor connected to drive a third element of said train to control the relative speed of said second element with respect to said transmission shaft, means for driving said motor, and control means for disengaging said clutch and engaging said brake and for simultaneously operating said motor to rotate said second element of said gear train at a predetermined speed regardless of the speed of said input shaft.

11. A synchronous speed control device having infinitely variable characteristics throughout its range of control comprising an epicyclic gear train including input and output gears, a stub shaft, gears fixed to said stub shaft and meshing with said input and output gears to provide a train of fixed ratio, a cage carrying said stub shaft and providing for infinite variation of said fixed ratio by relative rotation of said stub shaft about said input and output gears, a reversible motor connected to rotate said cage in forward and reverse directions with respect to rotation of said input gear, means driving said motor in forward and reverse directions, a reference control means arranged to generate a reference signal corresponding to a desired speed differential between said input and output gears, feedback means responsive to speed changes of said cage to vary said reference signal, and means operatively connecting said reference control means to said driving means for varying the speed of said driving means in accordance with variation in said reference signal to maintain a selected speed differential between said input gear and said output gear regardless of load on said output gear.

12. A synchronous speed control device having infinitely variable characteristics throughout its range of control comprising an epicyclic gear train including input and output gears, a stub shaft, gears fixed to said stub shaft and meshing with said input and output gears to provide a train of fixed ratio, a cage carrying said stub shaft and providing for infinite variation of said fixed ratio by relative rotation of said stub shaft about said input and output gears, a reversible motor connected to rotate said cage in forward and reverse directions with respect to rotation of said input gear, means driving said motor in forward and reverse directions, a synchronous control means maintaining a selected speed differential between said input and output gears regardless of the load on said output gear by controlling the speed of said motor in both forward and reverse directions, and means for holding said input gear stationary providing for inching of said output gear in both forward and reverse directions by said motor driving said cage.

13. An infinitely variable differential drive unit for a paper machine or the like having a rotating line shaft and a driven shaft to be rotated at a speed proportional to line shaft speed, comprising an input shaft, means for coupling said input shaft to the line shaft for driving said input shaft at a speed directly proportional to line shaft speed, an output shaft adapted for connection with the drive shaft, a transmission shaft, means driving said transmission shaft from said input shaft, an epicyclic gear train including input and output gear elements, planetary gears providing a drive connection between said input and output gear elements, a cage supporting said plentary gears, means supporting said cage for rotative movement to revolve said planetary gears about said input and output gear elements and vary the overall difference in speed between said input and output gear elements, means coupling said input gear element to said transmission shaft, means coupling said output gear element to said output shaft, a reversible hydraulic motor operatively connected to rotate said cage, means sensing the speed differential between said input shaft and said cage for producing an output signal variable in relation to changes in said speed differential, and means for regulating the speed and direction of rotation of said motor in accordance with variations in said signal to maintain the rotational speed of said output gear element in predetermined relation to the rotational speed of said input shaft.

14. A differential drive unit and speed regulating device for a paper machine or the like having a line shaft and a driven shaft, comprising an input shaft, means for coupling said input shaft to the line shaft for driving said input shaft at a speed fixed in proportion to line shaft speed, an output shaft adapted for connection with the driven shaft, an epicyclic gear train including first, second, and third elements mounted for relative rotation with respect to each other, means connecting said first element to said input shaft for driving in fixed relation thereto, means connecting said second element to said output shaft for driving in fixed relation thereto, reversible variable speed driving means connected to drive said third element to control the relative speed of said second element with respect to speed of input shaft, means for continuously comparing the speed of said first element with the speed of one of said other elements to detect variations in phase displacement between said first element and said one of said other elements, and means operative by said comparing means for regulating said variable speed driving means to provide synchronous speed characteristics for said second element.

15. A differential drive unit and speed regulating device for a paper machine or the like having a line shaft and a driven shaft, comprising an input shaft, means for coupling said input shaft to the line shaft for driving said input shaft at a speed fixed in proportion to line shaft speed, an output shaft adapted for connection with the driven shaft, an epicyclic gear train including first, second, and third elements mounted for relative rotation with respect to each other, means connecting said first element to said input shaft for driving in fixed relation thereto, means connecting said second element to said output shaft for driving in fixed relation thereto, a reversible variable speed hydraulic motor connected to drive said third element to control the relative speed of said second element with respect to speed of said input shaft, means for continuously comparing the speed of said first element with the speed of one of the other elements of said gear train to detect variations in phase displacement between said first element and said one of said other elements, and means operative by said comparing means for controlling the speed and direction of operation of said hydraulic motor to provide synchronous speed characteristics for said second element.

References Cited in the file of this patent

UNITED STATES PATENTS

| | | |
|---|---|---|
| 2,485,126 | Wood | Oct. 18, 1949 |
| 2,514,240 | Hornbostel | July 4, 1950 |